(12) United States Patent
Wilkens

(10) Patent No.: US 6,889,881 B2
(45) Date of Patent: May 10, 2005

(54) VEHICLE MOUNTED STORAGE UNIT

(75) Inventor: Larry G. Wilkens, Colorado Springs, CO (US)

(73) Assignee: Sausage Express A, Colorado Springs, CO (US)

( * ) Notice: Subject to any disclaimer, the term of this patent is extended or adjusted under 35 U.S.C. 154(b) by 7 days.

(21) Appl. No.: 10/346,344

(22) Filed: Jul. 16, 2003

(65) Prior Publication Data

US 2004/0079778 A1 Apr. 29, 2004

Related U.S. Application Data

(60) Provisional application No. 60/349,448, filed on Jan. 18, 2002.

(51) Int. Cl.$^7$ .................................. B60R 9/06
(52) U.S. Cl. ................ 224/509; 224/511; 224/537; 224/547; 224/553; 224/571
(58) Field of Search .................. 224/42.12, 509, 224/42.13, 42.24, 511, 533, 537, 547, 553, 558, 567, 571; 296/37.1, 37.2, 37.7, 218

(56) References Cited

U.S. PATENT DOCUMENTS

| | | | | |
|---|---|---|---|---|
| 2,554,776 A | * | 5/1951 | Comeau | 224/509 |
| 3,268,131 A | | 8/1966 | Benton | |
| 3,658,201 A | * | 4/1972 | Williams et al. | 224/42.13 |
| 4,467,944 A | | 8/1984 | Manko et al. | |
| 4,771,926 A | | 9/1988 | Anderson et al. | |
| 4,785,980 A | * | 11/1988 | Redick | 224/511 |
| 4,848,628 A | | 7/1989 | Lopez | |
| D328,052 S | | 7/1992 | Stout, III | |
| 5,193,874 A | | 3/1993 | German et al. | |
| 5,203,479 A | | 4/1993 | Lucas | |
| 5,219,106 A | | 6/1993 | Glunt | |
| 5,228,608 A | | 7/1993 | Stout, III | |
| 5,236,062 A | * | 8/1993 | Laney | 224/511 |
| 5,236,342 A | | 8/1993 | Pellettier | |
| 5,360,254 A | | 11/1994 | Sorimachi et al. | |
| 5,462,211 A | | 10/1995 | Eversoll | |
| 5,465,883 A | * | 11/1995 | Woodward | 224/537 |
| 5,657,913 A | * | 8/1997 | Cucheran et al. | 224/547 |
| 5,725,273 A | | 3/1998 | Vernon et al. | |
| 5,826,768 A | * | 10/1998 | Gamulo | 224/511 |
| 5,904,281 A | * | 5/1999 | Mooers | 224/526 |

* cited by examiner

Primary Examiner—Gary E. Elkins
(74) Attorney, Agent, or Firm—Reising, Ethington, Barnes, Kisselle, Learman, P.C.

(57) ABSTRACT

The vehicle mounted storage unit includes a support bracket that is clamped to a vehicle's spare tire and wheel rack on the outside of a vehicle by the fasteners that clamp the wheel to the rack. A storage unit frame is attached to the support bracket by a mechanical fastener. A pair of spaced apart left upper door panel post receiving tubes are mounted on the unit frame. A pair of spaced apart right upper door panel post receiving tubes are also mounted on the storage unit frame. The posts are positioned to minimize the space required for the door panel panels. Side curtain hangers are also secured to the storage unit frame. An inner pan is attached to the unit frame. An outer pan is pivotally connected to the unit frame. The two pans cooperate to encase the unit frame and vehicle components supported by the unit frame.

9 Claims, 8 Drawing Sheets

VEHICLE MOUNTED STORAGE UNIT

The disclosure incorporates a vehicle mounted storage unit disclosed in provisional patent application 60/349,448, filed Jan. 18, 2002, whose priority is claimed for this application.

TECHNICAL FIELD

The vehicle mounted storage unit for storing removable vehicle parts includes a frame, that is removably attached to the vehicle and carries frame components to which vehicle parts can be attached. The storage unit frame is attachable to a spare tire and wheel rack.

BACKGROUND OF THE INVENTION

Vehicles with passenger compartment parts that can be removed to improve visibility for occupants are sold under the trademark JEEP, a registered trademark of Daimler Chrysler Corporation. Other companies make vehicles with similar characteristics. The parts that can be removed include upper sections of doors, rear side panels, rear panels, and tops. The components that can be removed may be partially made of canvas or other flexible material. See-through portions are often a flexible transparent plastic material.

Such vehicles are used by people who desire to look for wildflowers, mushrooms, other plants, birds, and other animals and beautiful scenery in remote areas that are not accessible from paved roads. While looking at such nature, the plants, animals and scenes are often recorded on photographic film or electronically by cameras. To identify plants and animals it is desirable to remove side panels from a vehicle to improve sight, sound and smell. To obtain good pictures with a camera it is almost mandatory to have only air between the camera lens and the subject of a photograph. Flexible transparent plastic, rigid transparent plastic and even clear glass cause some distortions that degrade the quality of photographs.

Vehicles with removable upper door panels, removable rear quarter panels, removable rear panels and four-wheel drive for traction are ideal. However, when removable panels are removed they must be stored someplace. The storage place should protect the removed panels from damage and should not take up space used by passengers or cargo. The stored panels should also remain with the vehicle so that the passenger compartment can be re-enclosed in the event of a weather change that brings precipitation, strong winds or reduces visibility.

SUMMARY OF THE INVENTION

The vehicle mounted storage unit is mounted on a spare tire and wheel rack on the outside of a vehicle. The space tire and wheel racks are normally on the rear of a vehicle but can also be on the side of a vehicle. The racks generally have three studs or three threaded bores that are positioned relative to each other to be received in or aligned with three of the studs or bolts passages in a vehicle wheel. The racks used on some vehicles could have two or more than three studs or threaded bores. A support bracket assembly includes a mounting plate that is secured to the spare tire and wheel storage rack. A tubular member with a threaded bore is welded to the support bracket mounting plate in a position in which it is in axial alignment with a passage through the wheel. A storage unit frame is attached to the tubular member by a bolt or other mechanical fastener. The bolt clamps the storage unit frame to a spare tire or to the tubular member if a spare tire and wheel is not mounted on the spare tire rack. Vehicle removal panel support brackets are connected directly to the storage unit frame. A vehicle removable panel cover is provided to protect the stored removable panels. The cover is supported by the removable panels or attached directly to the storage unit frame. The cover does not support the stored vehicle panels.

BRIEF DESCRIPTION OF THE DRAWINGS

The presently preferred embodiment of the invention is disclosed in the following description and in the accompanying drawings, wherein.

DESCRIPTION OF THE PREFERRED EMBODIMENTS

Figure 1:
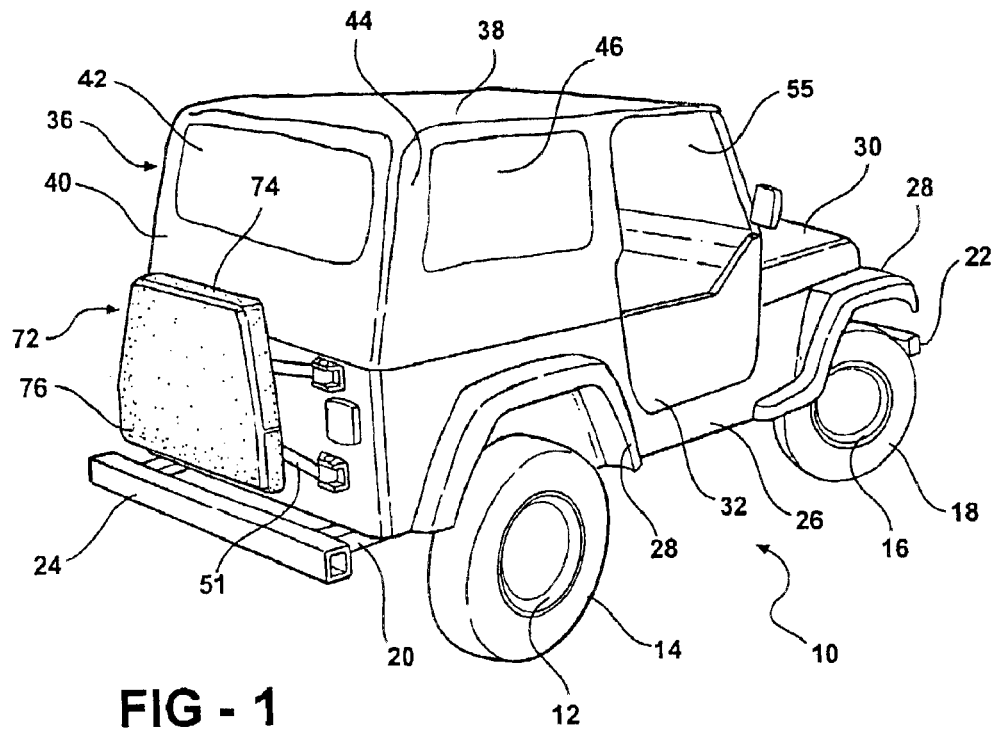
FIG. 1 is a perspective view of the storage unit and a container mounted on a vehicle and a vehicle spare tire and wheel carrier rack.

The vehicle 10 shown in FIG. 1 is a four-wheeled vehicle sold under the trademark JEEP owned by Daimler-Chrysler Corporation. The vehicle has two rear wheels 12 and tires 14 and two front steered wheels 16 and tires 18. All four wheels 12 and 16 of such vehicles are selectively driven making the vehicle 10 ideal transportation for off-road use. Similar vehicles are available from other manufacturers.

Figure 2:
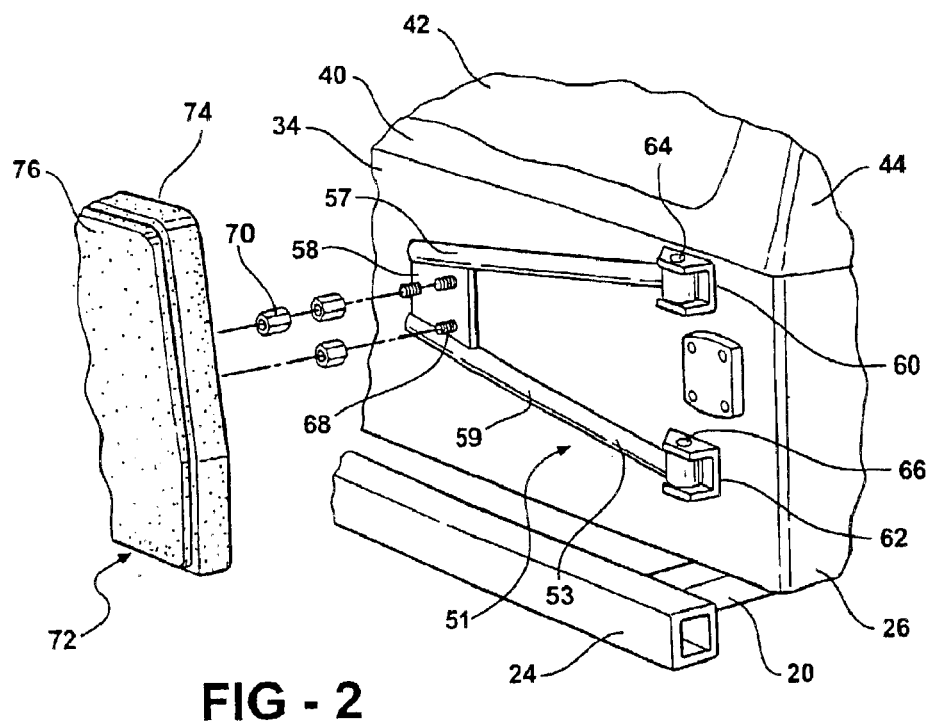
FIG. 2 is an expanded perspective view of the storage unit and container and the spare tire and wheel carrier rack with parts broken away.

The vehicle 10 has a frame 20, with a front bumper 22 and a rear bumper 24. A lower body 26, with fenders 28, an engine compartment hood 30, and two side doors 32, is mounted on the frame 20. The lower body 26 is generally made from a metal such as steel. The rear wall 34 of the lower body 25 as shown in FIGS. 1 and 2 is a fixed panel. The rear wall can also include a hinged tailgate that opens to provide access to a cargo area.

The passenger compartment and the rear combined cargo and passenger area can be enclosed with a removable cover 36. The removable cover 36 includes a top panel 38, a rear panel 40 with a window 42, and rear quarter panels 44 with side windows 46. An upper left door panel 48 and an upper right door panel 50 with windows 52 and 54 are attached to the side doors 32 to complete the enclosure. The removable cover 36 is generally made from fabric, a reinforced plastic such as fiberglass, or a combination of the two. The upper door panel windows 52 and 54 and the side windows 46 are generally a flexible transparent plastic material.

The passenger and cargo compartment is preferably completely enclosed by the removable cover 36, the rear quarter panels 44 and the upper door panels 48 and 50 when traveling on a highway at highway speeds or when there is precipitation. When moving cross country at slow speeds to observe scenery or wild animals, it is desirable to remove the rear quarter panels 44 and the upper door panels 48 and 50. If photographs are to be taken of animals or scenery it is mandatory to remove at least some of these panels. Care must be taken to protect the side windows 46 and the door windows 52 and 54, when they are removed from the removable cover 36, to protect the windows. The front windshield 55 is glass and is not removed but may be pivotable forward to a horizontal position above the hood 30 when the entire removable cover 36 is removed.

A spare tire 14 and wheel 12 is carried on a spare wheel and tire rack 51. The wheel rack 51 has an A-frame member 53 with an upper leg 57 and a lower leg 59. A plate 58 is integral with the apex of the legs 57 and 59. The ends of the legs 57 and 59 opposite the plate 58 are pivotally attached to an upper bracket 60 and a lower bracket 62 by coaxial pivot pins 64 and 66 for pivotal movement about a vertical axis. The brackets 60 and 62 are secured to the body 26. A latch (not shown) latches the plate 58 to the rear wall 34. Three spare wheel support studs 68 extend horizontally from the plate 58. These studs 68 are spaced apart to be in alignment with three lug bolt passages in the spare wheel 12. Elongated nuts 70 secure a spare wheel 12 to the studs 68 and the plate 58.

The spare wheel rack 51, as described above, is designed to be swingable to one side about the axis of the pivot pins 64 and 66 to allow a tailgate in the rear wall 34 to be opened. If the rear wall 34 does not include a tailgate or other door, the plate 58 could be attached directly to the body 26 in a fixed position and the remainder of the A-frame 53 could be eliminated.

The storage container assembly 72, as shown in FIGS. 1 through 5, includes an inner plastic pan 74 and an outer plastic pan 76. The inner plastic pan 74 has an inner vertical wall 78, a bottom wall 80, a top wall 82, a left side wall 84 and a right side wall 86, that form a large container with a shallow depth and an open side that is about the same size as the inner vertical wall 78. The outer plastic pan 76 has an outer vertical wall 88 and an integral bottom wall 90, a top wall 92, a left side wall 94, and a right side wall 96, that form a large container with a shallow depth and an open side that is about the same size as the outer vertical rear wall 88.

Figure 4:
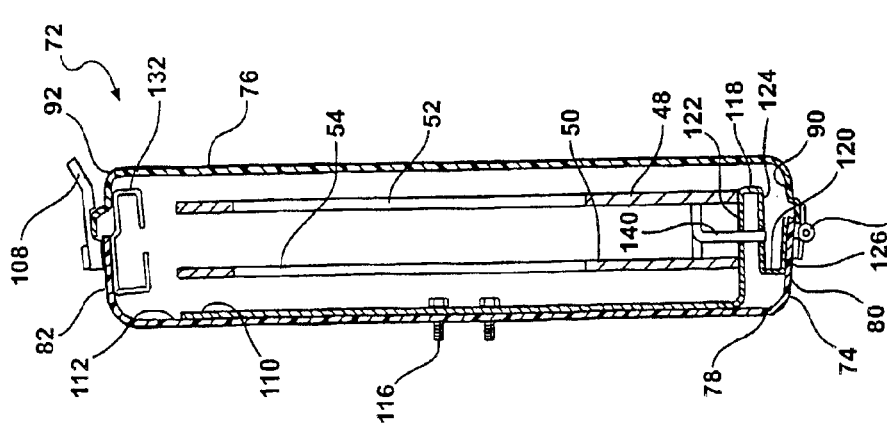
FIG. 4 is a sectional view taken along line 4—4 in FIG. 5.

A pair of hinges 100 and 102 are secured to the bottom wall 80 of the inner plastic pan 74 and the bottom wall 90 of the outer plastic pan 76. A flange 104 on the bottom wall 90, the top wall 92, the left side wall 94, and the right side wall 96, encircles the outer plastic pan 76 and telescopically receives a portion of the bottom wall 80, the top wall 82, the left side wall 84, and the right side wall 86 of the inner plastic pan 74 when the storage container assembly 72 is closed. A pair of latches 106 and 108 are attached to the top wall 82 by mechanical fasteners and engage the flange 104 to hold the outer plastic pan 76 in a closed position as shown in FIG. 4. If desired a seal can be added to keep water and dust out of the storage container 72.

A sheet metal frame 110 is positioned against the inside surface 112 of the inner vertical wall 78. Three bores 114 through the metal frame 110 line up with the spare wheel support studs 68 on the plate 58. Bolts 116 pass through the bores 114 in the metal frame 110, through bores through the vertical wall 78 and screw into the elongated nuts 70 that clamp a spare wheel 12 to the plate 58. The inner vertical wall 78 of the inner plastic pan 74 is clamped between the elongated nuts 70 and the sheet metal frame 110. The elongated nuts 70 preferably have sufficient length to mount a spare wheel 12 on the spare wheel support studs 68 between the storage container 72 and the plate 58. The spare wheel 12 is clamped to the plate 58 by the elongated nuts 70 before the inner plastic pan 74 is clamped in place by the bolts 116.

Figure 3:
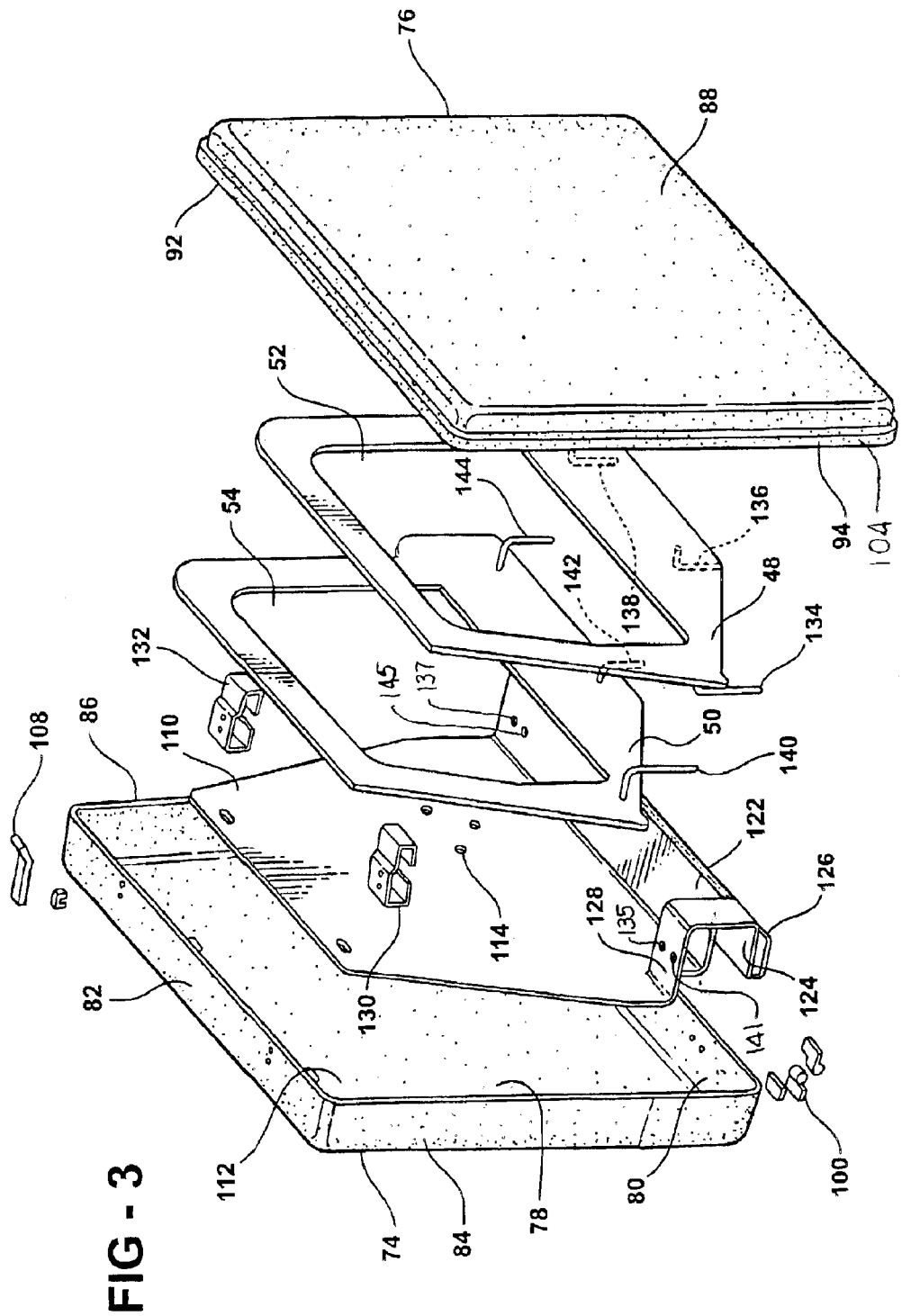
FIG. 3 is an enlarged expanded view of a first embodiment of the storage unit and container.
Figure 5:
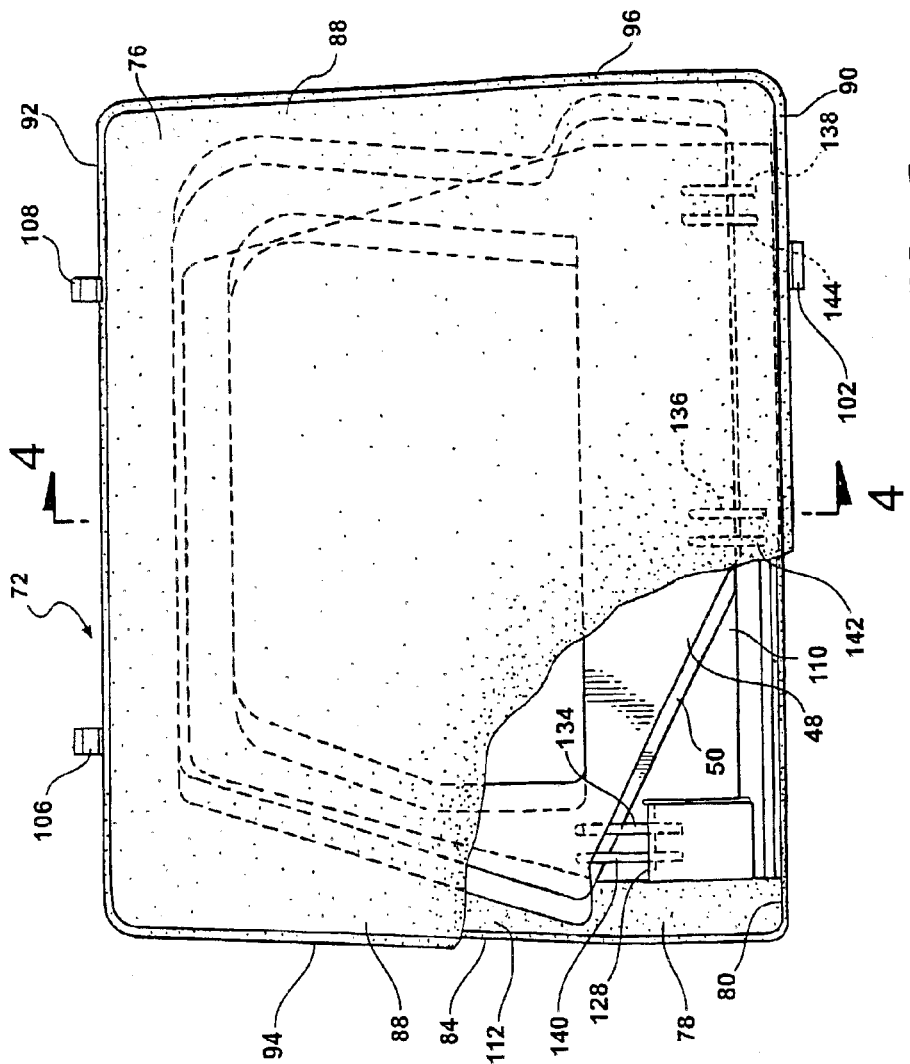
FIG. 5 is an elevation view of the storage unit and a container with parts broken away.

The sheet metal frame 110, as shown in FIGS. 3 and 4, is bent to form two U-shaped sections with two vertical bases 118 and 120 and three horizontal plate sections 122, 124 and 126. The left end of the plate section 122 is shaped to form a raised horizontal plate 128 that is above the horizontal plate section 122. The hinges 100 and 102 are preferably clamped to the horizontal plate section 126 of the metal frame 110 by the mechanical fasteners that connect the hinges to the bottom wall 80 of the inner plastic pan 74.

A pair of hanger brackets 130 and 132 are clamped to the bottom surface of the top wall 82 of the inner pan 74 by mechanical fasteners that connect the latches 106 and 108 to the top wall 82. The function of the hanger brackets 130 and 132 is described below.

The upper left door panel 48 has three integral posts 134, 136 and 138. The upper right door panel 50 also has three integral posts 140, 142 and 144. All six posts have free ends with vertical center axes. These vertical free ends of the posts 140, 142 and 144 are received in passages in the right door 42 when in use. The vertical free ends of the posts 134, 136 and 138 are received in passages in the left side door 32 when in use.

The upper right door panel 50 has its post 140 inserted into a bore 141 in the raised plate 128 and its posts 142 and 144 inserted into bores 145 through the plates 122 and 124 for storage. The upper left door panel 48 has its post 134 inserted into a bore 135 in the plate 128 and its posts 136 and 138 inserted into bores 137 through the plates 122 and 124 for storage. The upper right door panel 50 is positioned to the left from the upper left door panel for storage so that the bores in the metal frame 110 that receives the posts 134, 136 and 138 can be laterally spaced from the bores and the metal frame that receive the posts 140, 142 and 144.

The rear quarter panels 44 can also be stored in the storage container assembly 72 if they are removed. Both rear quarter panels 44 generally have a metal rod 45 that is received in a sleeve to stiffen one edge of the panels. These metal rods are received in the hanger brackets 130 and 132 to support the panels 44. The rear quarter panels 44, when in use, are tensioned by their connections to the top panel 38, the rear panel 40 and to the lower body 26. As a result, the new quarter panels do not require a stiff frame like the upper door panels 48 and 50 and weigh substantially less than the upper door panels. The rear quarter panels 44 could be provided with loops that are received in the hanger brackets 130 and 132 if they do not have an appropriate rod.

Figure 6:
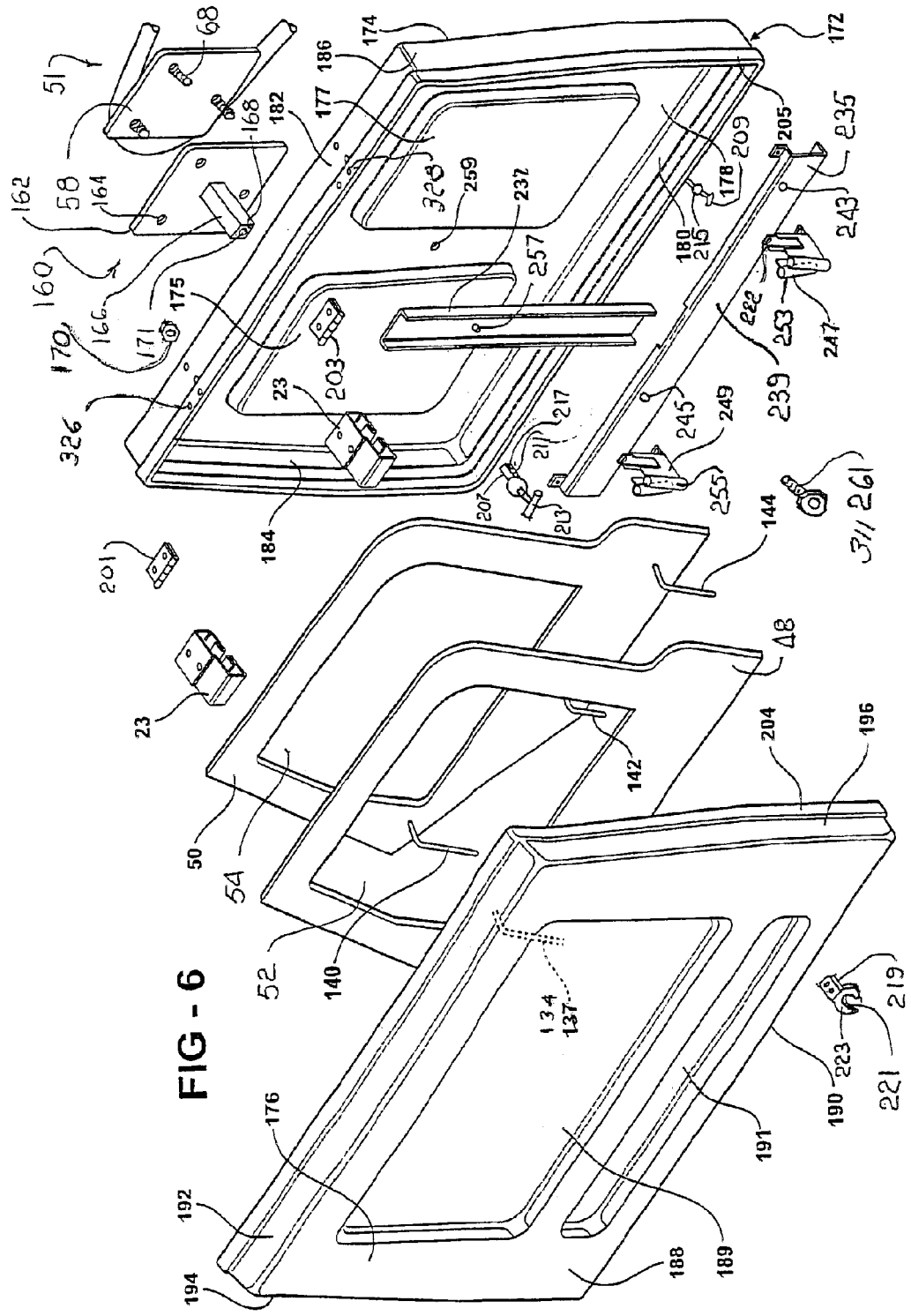
FIG. 6 is an expanded view of a second embodiment of the storage unit and a container.

Another embodiment of the vehicle panel storage unit is shown in FIG. 6. This embodiment has a support bracket assembly 160 with a flat mounting plate 162. The mounting plate 162 has three bores 164 that receive the spare wheel support studs 68. The spare wheel 12 is mounted on the studs 68 after the container mounting plate 162 is in place. The nuts 170, with a standard length, screw on to the studs 68 and clamp the spare wheel and the mounting plate 162 to the plate 58 of the spare wheel rack 51. An inboard end of the square tube 166 is welded to the center portion of the container mounting plate 162 in a position normal to the mounting plate. A plug 168 with a threaded bore 171 is inserted into the outboard end of the square tube 166 and welded in place.

A storage unit assembly 172 has an inner plastic pan 174 and an outer plastic pan 176. The inner plastic pan 174 has an inner vertical wall 178, a bottom wall 180, a top wall 182, and side walls 184 and 186. Two recesses 175 and 177 in the inner vertical wall 178 increase the rigidity of the inner plastic pan 174. The outer plastic pan 176 has an outer vertical wall 188, a bottom wall 190, a top wall 192, a left side wall 194 and a right side wall 196. Recesses 189 and 191 in the outer vertical wall 188 increase rigidity of the outer plastic pan 176.

A flange 204 on the bottom wall 190, the top wall 192, the left side wall 194 and the right side wall 196 encircles the outer plastic pan 176 and telescopically receives a portion of the flange 205 on the bottom wall 180, the top wall 182, the left side wall 184 and the right side wall 186 of the inner plastic pan 174 when the storage container assembly 172 is closed. If desired a seal can be added to seal between the flange 204 and the flange 205 on the inner plastic pan 174 to keep dust and moisture out of the container assembly 172.

Hinges 201 and 203 are secured to the top wall 182 of the inner plastic pan 174 and the top wall 192 of the outer plastic pan 176. A pair of latches 207 and 209 hold the container assembly 172 in a closed position. Both latches 207 and 209 include a stretchable bar 211 pivotally attached to the bottom wall 180 of the inner pan 174. A handle 213 is provided on a free end of the bar 211. A spherical portion 215 of the bar 211 is between the handle 213 and an anchor end 217 of the bar 210. A metal bracket 219 of each latch 207 and 209 is fastened to the bottom wall 190 of the outer plastic pan 176. The metal bracket has a slot 221 that receives the bar 211 and a concave surface 223 that engages the spherical portion 215 to hold the storage container assembly 172 closed.

An inverted T-shaped frame 235 includes a vertical channel member 237 and a horizontal channel member 239 that is welded to the vertical channel. A first door pin bracket 247 is bolted to bores 243 on one end of the horizontal channel 239. A second door pin bracket 249 is bolted to bores 245 in the horizontal channel 239. If required, a third door pin bracket can be bolted to the left hand end of the horizontal channel 239. Each door pin bracket 247 and 249 has two integral tubes 253 and 255 each of which receives one of the door pins 136, 138, 142 or 144 of two upper door panels 48 and 50. A third door pin bracket is generally not required. The door pin brackets 247 and 249 can be modified as required to hold upper door panels 48 and 50 of different designs.

A retainer bolt 311 passes through a bore 257 through the vertical channel member 237, through a bore 259 through the inner vertical wall 178 of the inner plastic pan 174 and screws into the threaded bore 171 in the plug 168 that is welded to the square tube 166. With this embodiment, the retainer bolt 311 is removed to remove the storage container 172 and obtain access to the spare wheel 12. The spare wheel is then removed by removing three nuts 170 from the space wheel support stud 68. The spare wheel 12 and the storage container 172 are reattached by reversing the procedure for removal of the spare wheel.

Hanger brackets 231 and 233 function just like the hanger brackets 130 and 132 described above.

The storage container assemblies 72 and 172 described above provides storage space for body components that are to be removed at times during operation. The containers 72 and 172 are convenient to use and protect the body components which they hold from damage.

Figure 7:
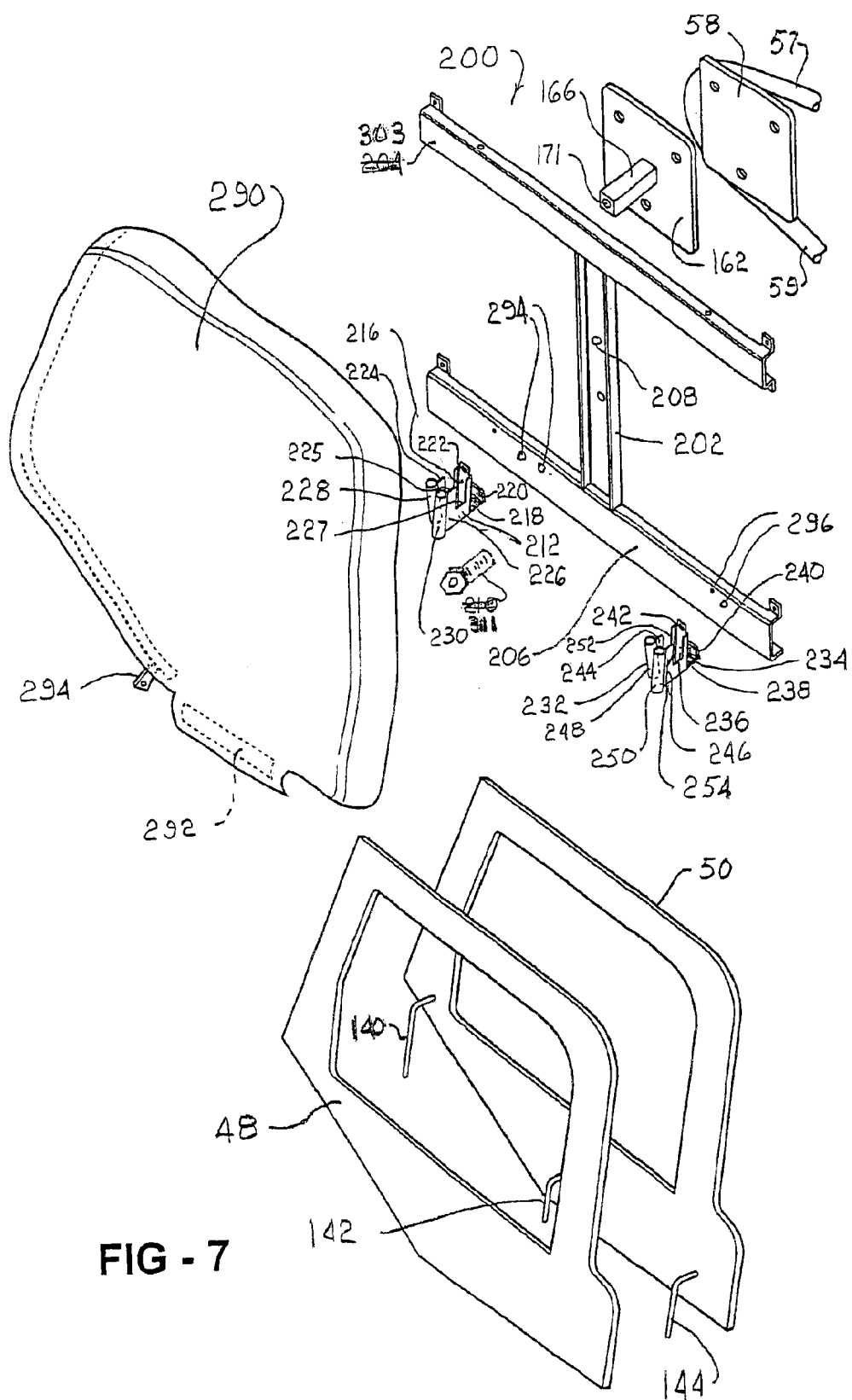
FIG. 7 is an expanded perspective view of a third embodiment of the storage unit.
Figure 8A:
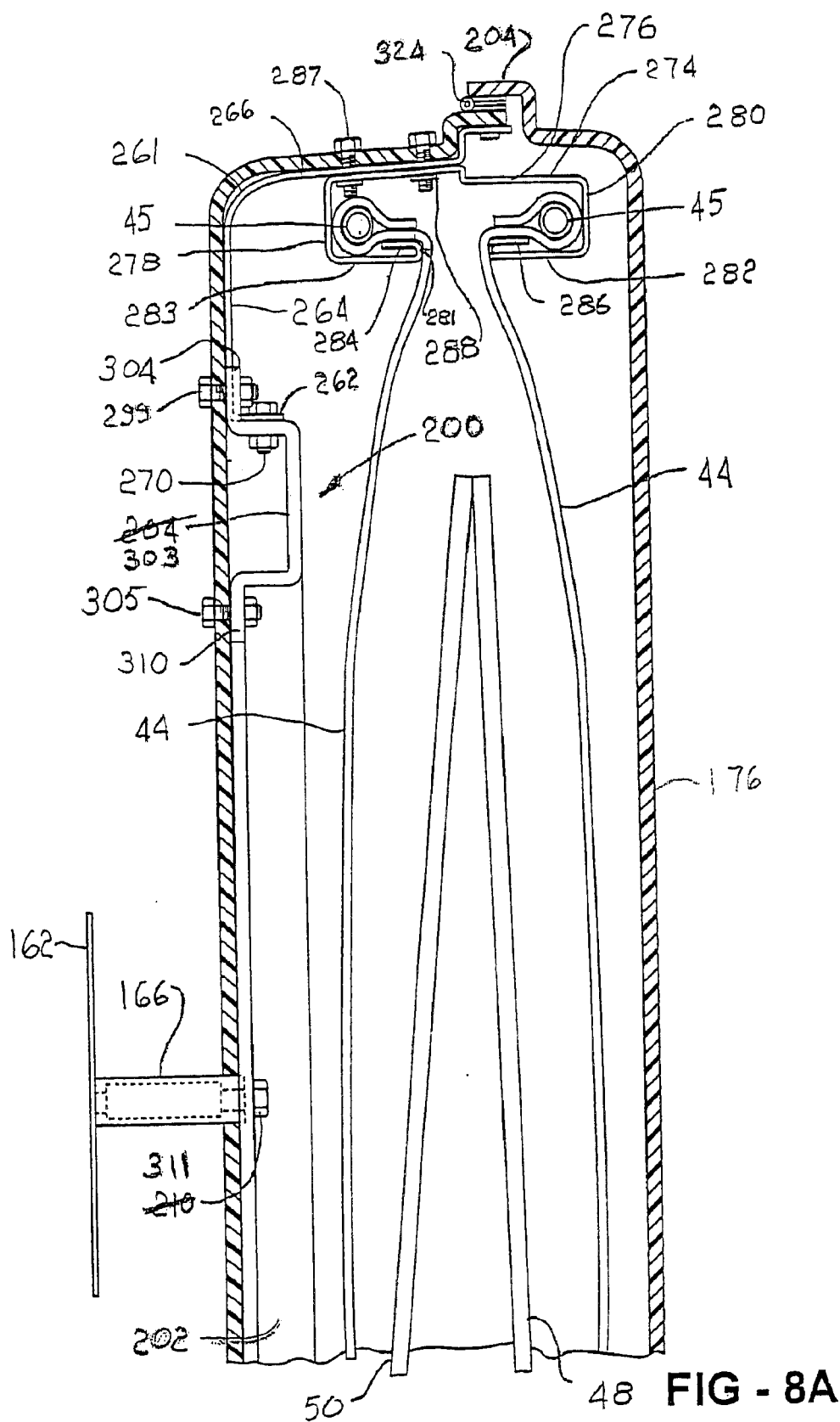
FIG. 8A is an enlarged vertical sectional view of the third embodiment of the storage unit with an optional rigid container added and the lower portion broken away.
Figure 8B:
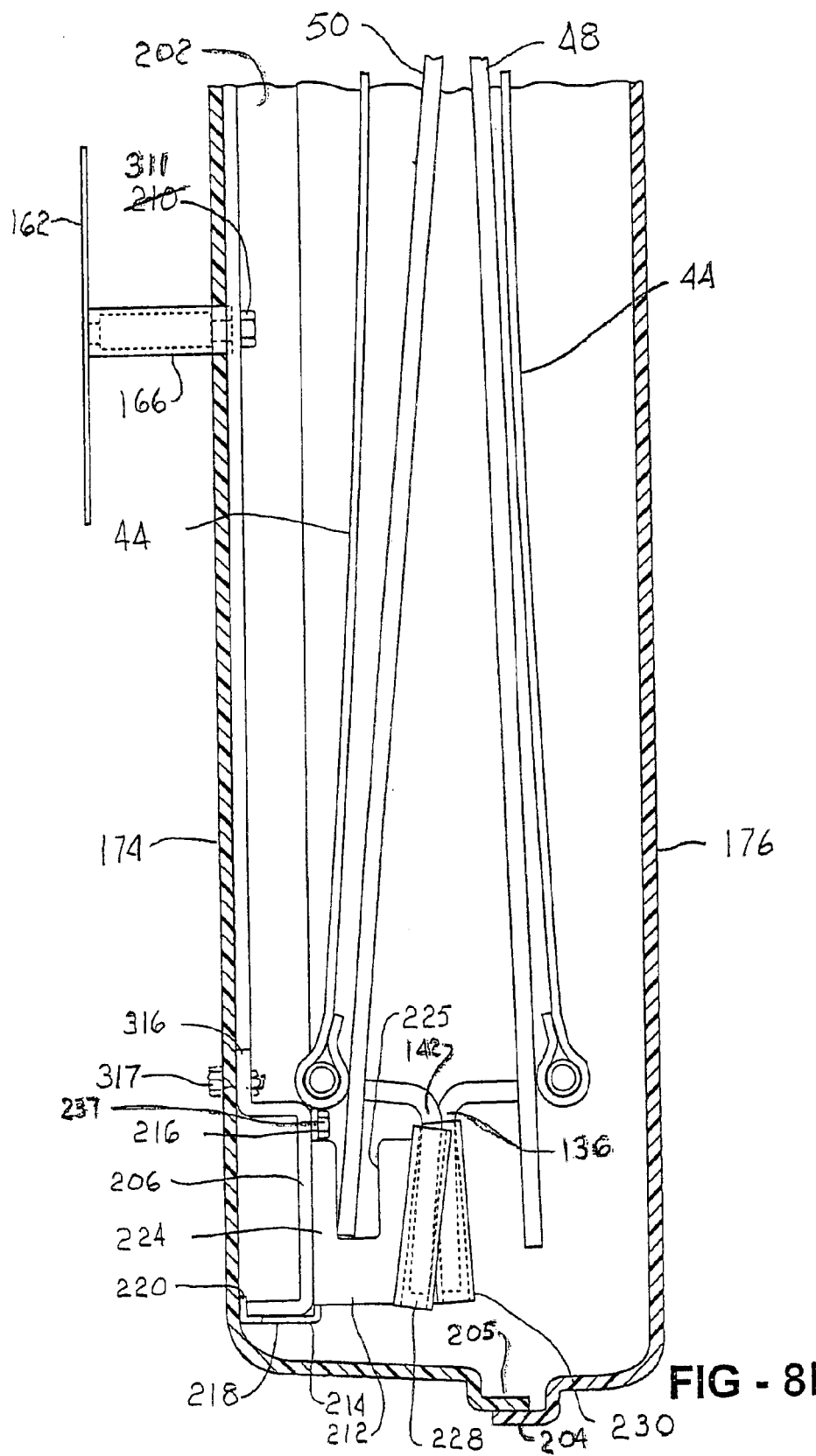
FIG. 8B is a sectional view similar to FIG. 8A with the upper portion broken away.
Figure 9:
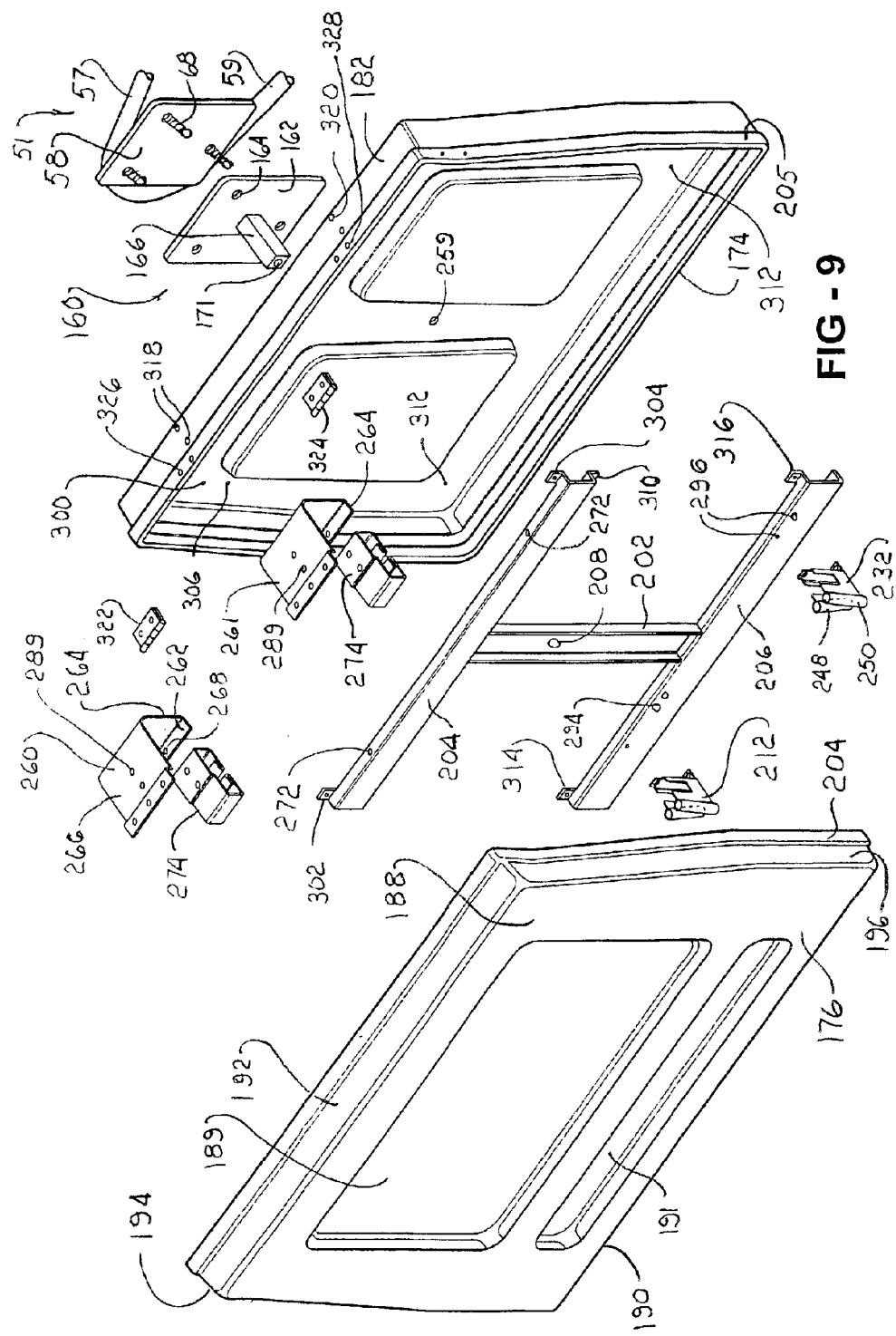
FIG. 9 is an expanded view of the third embodiment of the storage unit with rear quarter panel holders and the optional rigid container.

A third embodiment of the storage unit is shown in FIGS. 7 through 9. A panel storage unit frame 200, in the shape of an H lying on its side, has a vertical channel member 202, an upper horizontal channel member 303 and a lower horizontal channel member 206. The three channel members 202, 303 and 206 are welded to each other. An aperture 208 is provided through the vertical channel member 202. A bolt 311 passes through the aperture 208 and screws into the threaded bore 171 in the support assembly 160. When the bolt 311 is tightened, the frame 200 is clamped against the spare tire 14. If there is no spare tire 14, the vertical member 202 is clamped to the free end of the square tube 166. The aperture 208 through the vertical member 202 is preferably a little above the center of the frame 200 so that the frame does not extend above the top of the spare tire 14 and limit vision to the rear from the passenger compartment.

A first door pin bracket 212 includes an L-shaped portion 214 with a vertical member 216 and a horizontal member 218. The horizontal member 218 extends forward from the vertical member 216. A vertical flange 220 is integral with the free end of the horizontal member 218 and extends upward parallel to the vertical member 216. An aperture 222 passes through an upper portion of the vertical member 216. Wing members 224 and 226 extend rearward from opposite sides of the vertical member 216 of the L-shaped portion 214. Tubular members 228 and 230 are welded to the free ends of the wing members 224 and 226. The two tubes 228 and 230 are laterally spaced from each other. The left tube 228 extends upward and away from the vertical members 216 while the right tube 230 extends upward and toward the vertical member of the L-shaped portion 214. Both wing members 224 and 226 have a U-shaped opening 225 and 227 that extend downward from their upper edge and that are positioned forward of the tubes 228 and 230 and to the rear of the L-shaped portion 214. These U-shaped openings 225 and 227 receive the lower edge of the upper door panel 50 as shown in FIG. 8B.

A second door pin bracket 232 has the same structure as the first door pin bracket 212. Like the first door pin bracket 212, the second door pin bracket 232 has an L-shaped portion 234 with a vertical member 236, a horizontal member 238 and a vertical flange 240 integral with the free end of the horizontal member. An aperture 242 passes through an upper end of the vertical member 236. One wing member 244 extends rearward from the left side of the vertical member 236. Another wing member 246 extends rearward from the right side of the vertical member 236. A tubular member 248 is welded to the free end of the left wing member 244. A tubular member 250 is welded to the free end of the wing member 246. The two tubes 248 and 250 have axes that are in parallel spaced apart vertical planes. The tube 250 is spaced laterally to the right of the tube 248. The left tube 248 extends upward and rearward. The right tube 250 extends upward and forward. U-shaped openings 252 and 254 that extend downward from the upper edge of the wing members 244 and 246, are positioned between the tubes 248 and 250 and the L-shaped portion 234. The first door pin bracket 212 and the second door pin bracket 232 are substantially identical except for the horizontal distance between the tubes 228 and 230 or 248 and 250 and the aligned vertical member 216 or 236. These distances are varied to accommodate the upper door panels 48 and 50 and to hold the door panels close to the channel members 303 and 206. The angles between the tubes 228, 230, 248 and 250 are chosen to minimize the space occupied by two upper door panels 48 and 50 that are supported by the frame 200.

A pair of extension brackets 260 and 261 are formed from sheet metal. Each extension bracket 260 or 261 has a mounting flange 262, a generally vertical panel 264 and a generally horizontal top panel 266. The mounting flange 262 has at least one aperture 268. A bolt 270 passes through the aperture 268 and through a vertical bore 272 to attach an extension bracket 260 or 261 to the top of the horizontal channel member 303.

A side curtain hanger 274 is formed from a sheet metal strip. The sheet metal strip forms a generally horizontal mounting portion 276. Generally vertically depending portions 278 and 280 extend downward from the free ends of the mounting portion 276. Horizontal side curtain supports 282 and 283 extend inward toward each other from the depending portions 278 and 280 and form a side curtain rod slot 281 between them. Side curtain retainers 284 and 286 are integral with ends of the side curtain supports 282 and 283. A first side curtain hanger 274 is attached to the extension bracket 260 by bolts 287, that pass through apertures 289 in the extension bracket 260, and is screwed into nuts 288 secured to the horizontal mounting portion 276. A second side curtain hanger 274 is attached to the extension bracket 261 by bolts that pass through apertures 289 in the second extension bracket and screw into nuts 288 secured to the mounting portion 276 of the second side curtain hanger 274.

FIG. 7 shows a canvas bag 290 that receives two upper door panels 48 and 50. The door panels 48 and 50 have their integral posts 136 and 142 inserted into a first door pin bracket 212 and posts 138 and 144 inserted into the second door pin bracket 232. The left door pin bracket 212 works for all the upper door panels used on Jeep vehicles manufactured for a number of years. The second door pin bracket 232 is used on the right side. There are two different door pin brackets 232 that are used on the right side depending upon the model year of the vehicle the upper door panel fits. Both panels 232 are the same except for the dimensions. The distance between the tubes 248 and 250 and the vertical member 236 is increased to accommodate the upper door panels 48 and 50 used on late model vehicles 10.

The first door pin bracket 212 is secured to the lower horizontal channel member 206 by a bolt 237 that passes through the aperture 222 and screws into one of the threaded apertures 294 in the channel member. The vertical flange 220 engages the inner side of the lower channel member 206 to secure the door pin bracket 212 to the channel member 206 when the bolt 216 is tightened.

The second door pin bracket 232 is secured to the lower horizontal channel member 206 by positioning the bottom of the lower horizontal channel member on the horizontal member 238 and between the vertical member 236 and the vertical flange 240 and then inserting a bolt 237 through the aperture 242 and screwing the bolt into one of the threaded apertures 296 in the channel member. Multiple apertures 294 and 296 are provided to accommodate upper door panels 48 and 50 with different spacing between the posts 136 and 138 as well as between the posts 142 and 144. Different threaded apertures 294 and 296 can also be used to shift upper left and right door panels 48 and 50 toward one side of the frame 200 when the spare tire 14 and wheel 12 is mounted to one side of the rear of the vehicle 10.

Only two door pin brackets 212 and 232 are required. However, a third door pin bracket could be added to receive the integral posts 134 and 140 is desired. Retainer members can be provided to retain the integral posts 136, 138, 142 and 144 in the door pin brackets 212 and 232.

Two upper door panels 48 and 50 can be supported by the frame 200 and encased in a bag 290 if only two openings are required for a clear view of plants, animals and scenery. When the upper door panels 48 and 50 are the only members to be removed and stored, the extension brackets 260 and 261 and the side curtain hangers 274, described above, are not required. The bag 290 with an open bottom that is closed by hook and loop fasteners 292 as well as a zipper 294 will keep dust, mud and water off the upper door panels 48 and 50.

Rear quarter panels 44 and side windows 46 can be removed to increase the field of unobstructed view. Passengers in the rear portion of the vehicle 10 have substantially improved visibility with the rear quarter panels 44 and the side windows 46 removed and can take photographs. Rear quarter panels 44 and windows 46 can be stored on the frame 200 by attaching the extension brackets 260 and 261 to the horizontal channel member 204 as described above and attaching a first side curtain hanger 274 to one of the extension brackets and attaching a second side curtain hanger to the other extension bracket. The rear quarter panels 44 and windows 46 are protected somewhat if they are positioned between the frame 200 and the bag 290, that encases the upper door panels 48 and 50. The rear quarter panels 44 and the windows 46 could, if desired, be encased in a rear quarter panel bag similar to the bag 290 for the upper door panels 48 and 50.

Storage and protection for both the upper door panels and the rear quarter panels could be enhanced by the inner plastic pan 174 and the outer plastic pan 176 if desired. The inner plastic pan 174 is attached to the frame 200 by bolts 299 that pass through apertures 300 in the inner plastic pan and screw ears 302 and 304 welded to the top of the upper horizontal channel 303, bolts 305 that pass through apertures 306 in the inner plastic pan 174 and through ears 308 and 310 welded to the bottom of the upper horizontal channel, and by bolts 317 that pass through apertures 312 in the inner plastic pan 174 and through ears 314 and 316 welded to the lower horizontal channel member 206. The bolts 287 that connect the first side hanger 274 to the extension bracket 260 also passes through apertures 318 through the top wall 182 of the inner plastic pan 174 thereby clamping the top wall to the frame 200. The bolts 287 that connect the second side curtain hanger 274 to the extension bracket 261 also pass through apertures 320 through the top wall 182 of the inner plastic pan 174 and clamp the top wall to the frame 200.

Hinges 322 and 324 are connected to the respective extension brackets 260 and 261 by machine screws. Screws also pass through apertures 326 and 328 through the flange 204 and connect the hinges 322 and 324 to the top wall 192 of the plastic pan 176. A latch 207 latches the outer plastic pan 176 in a closed position. The frame 200 supports the upper left and right door panels 48 and 50 when they are stored. The frame 200 also supports the rear quarter panel 44 and the side windows 46 when they are stored.

A bag 290 can encase the upper left and right door panels 48 and 50 when the panels are supported by the frame 200. The inner plastic pan 174 and the outer plastic pan 176, when they are used, protect the door panels 48 and 50 and the rear guarter panels 44 from dust and moisture but do not support upper door panels or rear quarter panels. The inner plastic pan 174 is clamped to the frame 200. During use the inner plastic pan 174 is clamped between the frame 200 and the spare tire 14. If there is no spare tire, the inner plastic pan 174 is clamped to the frame 200 and the tube 166. One bolt 311 connects the frame 200 to a vehicle 10.

The disclosed embodiment is representative of a presently preferred form of the invention, but is intended to be illustrative rather than definitive thereof. The invention is defined in the claims.

I claim:

1. A vehicle mounted storage unit comprising:

a support bracket assembly including a mounting plate with at least two apertures that match a vehicle wheel bolt pattern on a vehicle spare wheel, a bar with one end fixed to the mounting plate and another end having a threaded bore with a threaded bore axis extending through the mounting plate and in alignment with a wheel passage through the vehicle spare wheel, and wherein the mounting plate is adapted to be clamped to a spare wheel carrier assembly and positioned between the vehicle spare wheel and the spare wheel carrier assembly;

a storage unit frame having a mounting aperture, and a single mounting bolt that passes through the mounting aperture, screws into the threaded bore in the support bracket assembly, and wherein the single mounting bolt forces the storage unit frame toward the mounting plate;

a first left upper door panel post receiving passage in the storage unit frame adapted to receive a first upper left door panel post and a second left door upper door panel post receiving passage in the storage unit frame adapted to receive a second upper left door panel post; and a first right upper door panel post receiving passage in the storage unit frame adapted to receive a first upper right door panel post and a second right upper door panel post receiving passage in the storage unit frame adapted to receive a second upper right door panel post.

2. A vehicle mounted storage unit comprising:

a support bracket assembly including a mounting plate with at least two apertures that match a vehicle wheel bolt pattern on a vehicle spare wheel, a bar with one end fixed to the mounting plate and another end having a threaded bore with a threaded bore axis extending through the mounting plate and in alignment with a wheel passage through the vehicle spare wheel, and wherein the mounting plate is adapted to be clamped to a spare wheel carrier assembly and positioned between the vehicle spare wheel and the spare wheel carrier assembly;

a storage unit frame having a mounting aperture, and a single mounting bolt that passes through the mounting aperture, screws into the threaded bore in the support bracket assembly, and wherein the single mounting bolt forces the storage unit frame toward the mounting plate;

a first left upper door panel post receiving passage in the storage unit frame adapted to receive a first upper left door panel post and a second left upper door panel post receiving passage in the storage unit frame adapted to receive a second upper left door panel post; and a first right upper door panel post receiving passage in the storage unit frame adapted to receive a first upper right door panel post and a second right upper door panel post receiving passage in the storage unit frame adapted to receive a second upper right door panel post.

3. A vehicle mounted storage unit comprising:

a support bracket assembly including a mounting plate having at least three apertures that are positioned to receive a plurality of wheel support studs of a spare wheel and tire rack mounted on a vehicle, a support bar having one end fixed to the mounting plate generally between the at least three apertures, a second end having a threaded bore, and wherein the support bar extends outward from an outer side of the mounting plate;

a storage unit frame including an upper horizontal frame member, a lower horizontal frame member, a vertical frame member with an upper member end secured to the upper horizontal frame member and a lower member end secured to the lower horizontal frame member, at least one frame mounting aperture through the vertical frame member, and a mounting bolt passing through the frame mounting aperture and received in the threaded bore in the support bracket assembly for connecting the storage unit frame to the support bracket assembly and removable from the threaded bore for releasing the storage unit frame from the support bracket assembly;

a first door pin bracket attached to an outer side of the lower horizontal frame member and including a first left upper door panel post receiving passage, and a first right upper door panel post receiving passage spaced from the first left upper door panel post receiving passage in a direction parallel to a lower horizontal frame member long axis;

a second door pin bracket attached to an outer side of the lower horizontal frame member and including a second left upper door panel post receiving passage, and a second right upper door panel post receiving passage spaced from the second left upper door panel post receiving passage in a direction parallel to the lower horizontal frame member long axis.

4. A vehicle mounted storage unit, as set forth in claim 3, wherein the first left upper door panel post receiving passage is formed by a first left tube of the first door pin bracket; the first right upper door panel post receiving passage is formed by a first right tube of the first door pin bracket; the second left upper door panel post receiving passage is formed by a second left tube of the second door pin bracket; and the second right upper door panel post receiving passage is formed by a second right tube of the second door pin bracket.

5. A vehicle mounted storage unit, as set forth in claim 4, wherein the first left tube and the first right tube extend upwardly and toward each other; and wherein the second left tube and the second right tube extend upwardly and toward each other.

6. A vehicle mounted storage unit, as set forth in claim 3, wherein the distance between the first door pin bracket and the second door pin bracket is adjustable.

7. A vehicle mounted storage unit, as set forth in claim 3, including a first side curtain hanger attached to the upper horizontal frame member, and a second side curtain hanger attached to the upper horizontal frame and spaced from the first side curtain hanger.

8. A vehicle mounted storage unit, as set forth in claim 3, including at least one extension bracket attached to the upper horizontal frame member and extending rearward from the upper horizontal frame member.

9. A vehicle mounted storage unit, as set forth in claim 8, including an inner pan attached to an inner side of the storage unit frame; at least one hinge secured to the at least one extension bracket; an outer pan connected to the at least one hinge and pivotable between an open position and a closed position in which the entire storage unit frame is encased in a storage container formed by the inner pan and the outer pan.

* * * * *